(12) United States Patent
Chin et al.

(10) Patent No.: US 9,747,135 B2
(45) Date of Patent: Aug. 29, 2017

(54) MULTI-DIMENSION SCHEDULING AMONG MULTIPLE CONSUMERS

(71) Applicant: International Business Machines Corporation, Armonk, NY (US)

(72) Inventors: Alicia E. Chin, Markham (CA); Michael Feiman, Richmond Hill (CA); Zhenhua Hu, Toronto (CA); Jason T. S. Lam, Markham (CA); Zhimin Lin, Scarborough (CA); Lei Su, Beijing (CN); Hao Zhou, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/859,672

(22) Filed: Sep. 21, 2015

(65) Prior Publication Data

US 2016/0306672 A1 Oct. 20, 2016

Related U.S. Application Data

(63) Continuation of application No. 14/690,866, filed on Apr. 20, 2015.

(51) Int. Cl.
*G06F 9/46* (2006.01)
*G06F 9/50* (2006.01)
(52) U.S. Cl.
CPC .......... *G06F 9/505* (2013.01); *G06F 9/5005* (2013.01); *G06F 9/5027* (2013.01); *G06F 9/5038* (2013.01); *G06F 2209/5011* (2013.01)
(58) Field of Classification Search
CPC .................................................. G06F 9/5027
USPC ........................................................ 718/104
See application file for complete search history.

(56) References Cited

U.S. PATENT DOCUMENTS

| 7,451,448 | B1 * | 11/2008 | Rhee ................... G06F 9/5027 709/225 |
| 8,533,724 | B1 * | 9/2013 | Theimer .............. G06F 9/5077 718/1 |
| 8,612,615 | B2 | 12/2013 | Ferris et al. |
| 8,813,090 | B2 | 8/2014 | Jamjoom et al. |
| 8,832,219 | B2 | 9/2014 | Morgan |

(Continued)

FOREIGN PATENT DOCUMENTS

WO 2014049251 A1 4/2014

OTHER PUBLICATIONS

Lin, C T; "Comparative Based Analysis of Scheduling Algorithms for Resource Management in Cloud Computing Environment"; JCSE International Journal of Computer Science and Engineering; Jul. 2013; pp. 17-23, vol. 1, Issue 1.
Grewal et al.; "A Rule-Based Approach for Effective Resource Provisioning in Hybrid Cloud Environment"; AISC 203, pp. 41-57; Springer-Verlag Berlin Heidelberg 2013.
Gulati et al.; "VMware Distributed Resource Management: Design, Implementation, and Lessons Learned"; pp. 45-64.

(Continued)

*Primary Examiner* — Qing Chen
*Assistant Examiner* — Clint Thatcher
(74) *Attorney, Agent, or Firm* — A. Imtiaz Billah

(57) ABSTRACT

Embodiments of the present invention provide systems and methods for allocating multiple resources. In one embodiment, a configured resource plan is used to construct a hierarchical tree. The system then identifies a set of unowned resources from the configured resource plan and sends the set of unowned resource to a share pool. The share pool is either a global or local pool and can be accessed by one or more consumers. In response to changes in workload demands, a set of unused resources are lent to a global or local pool.

7 Claims, 8 Drawing Sheets

(56) References Cited

U.S. PATENT DOCUMENTS

| | | | |
|---|---|---|---|
| 2008/0109343 A1 | 5/2008 | Robinson et al. | |
| 2008/0155100 A1* | 6/2008 | Ahmed | G06F 9/5011 709/226 |
| 2012/0042256 A1 | 2/2012 | Jamjoom et al. | |
| 2014/0137104 A1* | 5/2014 | Nelson | G06F 9/45558 718/1 |
| 2014/0173595 A1* | 6/2014 | Anand | G06F 9/455 718/1 |
| 2015/0040131 A1* | 2/2015 | Shan | G06F 9/5027 718/1 |

OTHER PUBLICATIONS

Yang et al.; "A Cost-based Resource Scheduling Paradigm in Cloud Computing"; 2011 12th International Conference on Parallel and Distributed Computing, Applications and Technologies; © 2011 IEEE; pp. 417-422.

Yu et al.; "System Resource Allocation Algorithm for Multi-tenant SaaS Application"; 2011 International Conference on Cloud and Service Computing; © 2011 IEEE; pp. 207-211.

"Grace Period Disclosure"; "IBM Platform Symphony V7.1, with an Application Service Controller enables scalable, high-performance grid services for parallel computer- and data-intensive applications"; IBM Europe, Middle East, and Africa Software Announcement, ZP14-0459, pp. 1-23; Announcement date Oct. 6, 2014, Availability date Dec. 5, 2014.

U.S. Appl. No. 14/690,866, filed Apr. 20, 2015; Entitled "Multi Dimension Scheduling Among Multiple Consumers".

Appendix P: List of IBM Patents or Patent Applications Treated as Related, dated Sep. 21, 2015, 2 pages.

\* cited by examiner

MULTI-DIMENSION SCHEDULING AMONG MULTIPLE CONSUMERS

BACKGROUND OF THE INVENTION

Statement on Prior Disclosures by an Inventor

The following disclosure(s) are submitted under 35 U.S.C. 102(b)(1)(A) as prior disclosures by, or on behalf of, a sole inventor of the present application or a joint inventor of the present application:

"IBM Platform Symphony V7.1, with an Application Service Controller enables scalable, high-performance grid services for parallel computer- and data-intensive applications"; IBM Europe, Middle East, and Africa Software Announcement, ZP14-0459, Dated Oct. 6, 2014 (Planned Availability Date Dec. 5, 2014); http://www-01.ibm.com/common/ssi/rep_ca/9/877/ENUSZP14-0459/ENUSZP14-0459.PDF.

The present invention relates generally to the field of resource management and more specifically to resource scheduling among multiple consumers.

Computing applications often require multiple dimensions of resources. Some examples of dimensions are memory, CPU cores, software licenses, etc. Workload demands change with time and a resource scheduler allocates resources to various consumers (i.e., users), according to multi-consumer policies and current demands to facilitate the completion of tasks (i.e., computing processes). A resource scheduler is a program that allocates resources for computing processes to better ensure that the appropriate resources are allocated properly. For example, certain workloads may require memory-intensive resources while others may require more CPU-intensive resources. The resource scheduler aims to limit (and even eliminate) inefficiencies such as resource starvation of a consumer and enforce policies to allow important consumers to get a minimum resource guarantee when needed. The tasks within a workload may be completed on computers, machines, or host sites.

SUMMARY

According to one embodiment of the present invention, a method for allocating multiple resources is provided, the method comprising: receiving, by one or more processors, a configured resource plan; constructing, by one or more processors, a hierarchical tree from the configured resource plan; identifying, by one or more processors, a set of unowned resources from the configured resource plan; sending, by one or more processors, the set of unowned resources to a share pool, wherein the share pool is configured to be accessible to one or more consumers and wherein the share pool comprises a global pool and a local pool; determining, by one or more processors, a change in a workload demand from the one or more consumers; and responsive to determining a change in the workload demand from the one or more consumers, lending, by one or more processors, a set of unused resources to a global pool or a local pool.

Another embodiment of the present invention provides a computer program product for allocating multiple resources, based on the method described above.

Another embodiment of the present invention provides a computer system for allocating multiple resources, based on the method described above.

DETAILED DESCRIPTION

Computing applications often requires multiple resources in order to complete tasks. Since a finite a number of resources are available and utilized among multiple consumers, a multi-consumer policy is needed to improve the efficiency, prioritization, and fairness of resource allocation. Workloads which dictate how and when resource groups will be used to meet consumer demands may change, however, essential computing tasks must be completed. Inflexible multi-consumer policies and the inability to efficiently complete these tasks lead to inefficient use of resources and potential resource starvation of important consumers. Embodiments of the present invention provide systems and methods for the efficient allocation and utilization of resources by taking into consideration the needs of multiple consumers and changing workloads.

Figure 1:
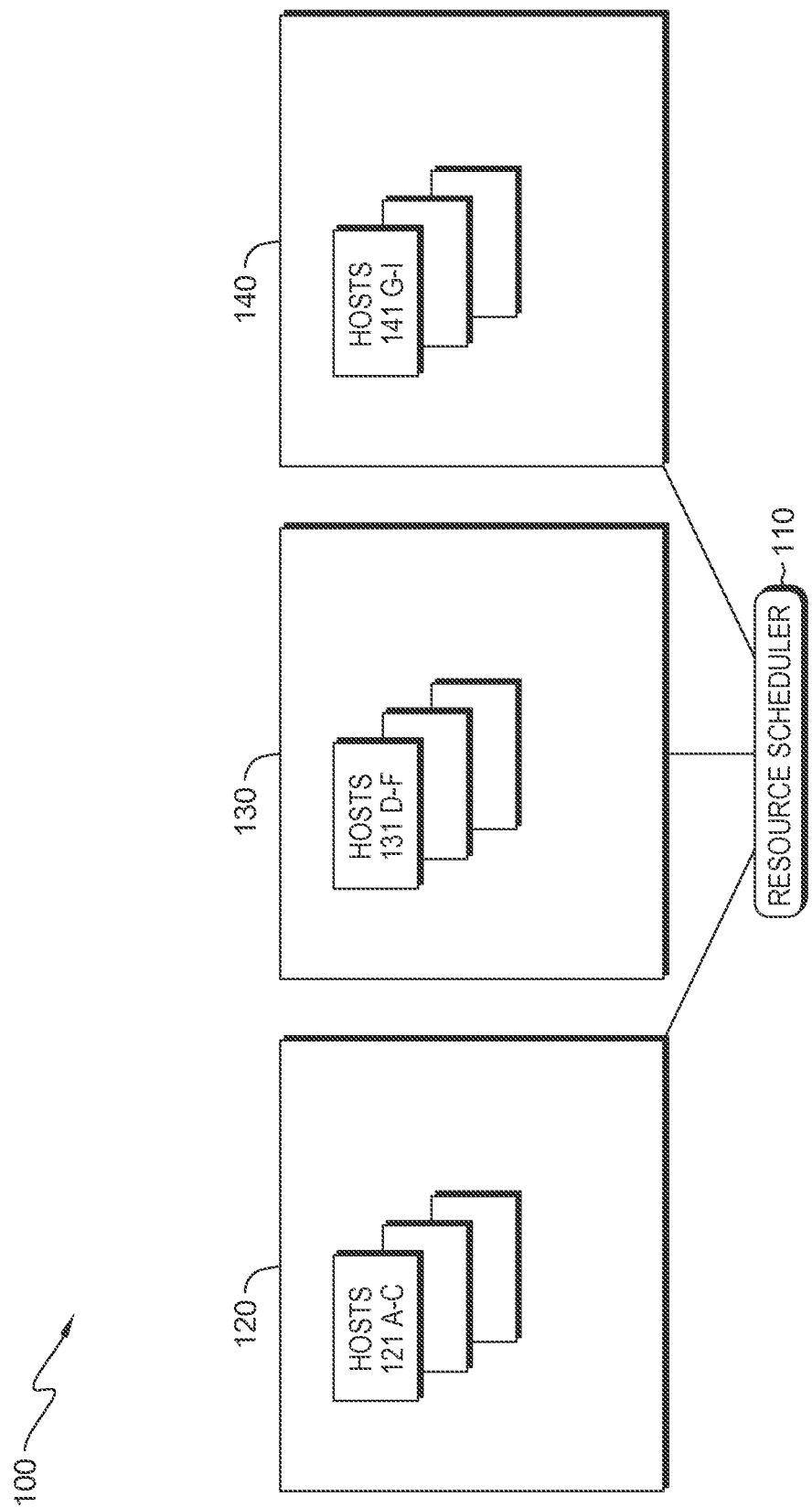
FIG. 1 is a functional block diagram illustrating a resource group environment, in accordance with an embodiment of the present invention.

FIG. 1 is a functional block diagram illustrating a resource group environment, in accordance with an embodiment of the present invention. FIG. 1 provides only an illustration of implementation and does not imply any limitations with regard to the environments in which different embodiments may be implemented. Modifications to resource group environment 100 may be made by those skilled in the art without departing from the scope of the invention as recited by the claims. In this exemplary embodiment, resource group environment 100 includes resource scheduler 110 and resource groups 120, 130, and 140.

Resource group 120 includes hosts 121A-C; resource group 130 includes hosts 131D-F; and resource group 140 includes hosts 141G-I. A resource group is a cluster of resources which is convenient for resource management. A resource may be physical machines, virtual machines, OS, server, CPU, memory, disk space, software licenses, or any type of computing resource. A host is the physical site where these resources are located for use by consumers. While FIG. 1 depicts resource groups 120, 130, and 140 including clusters of three hosts, in other embodiments, each of resource groups 120, 130, and 140 may include any number of hosts, which can be supported by the resource group environment.

Resource scheduler 110 may be a laptop computer, a tablet computer, a netbook computer, a personal computer (PC), a desktop computer, a personal digital assistant (PDA), a smart phone, a thin client, or any programmable electronic device. Resource scheduler 110 processes consumer workload demands among multiple consumers and maximizes efficient utilization of multiple resources by employing a multi-consumer policy. In this exemplary embodiment, resource scheduler 110 retrieves consumer requests, permits partial resource ownership within hosts, initiates the utilization of different resources upon identification of changes in workload demands, moves certain resources to a shared resource pool, lends out resources, and incorporates consumer hierarchy. Resource scheduler 110 may include internal and external hardware components, as depicted and described in further detail with respect to FIG. 8.

Figure 2:
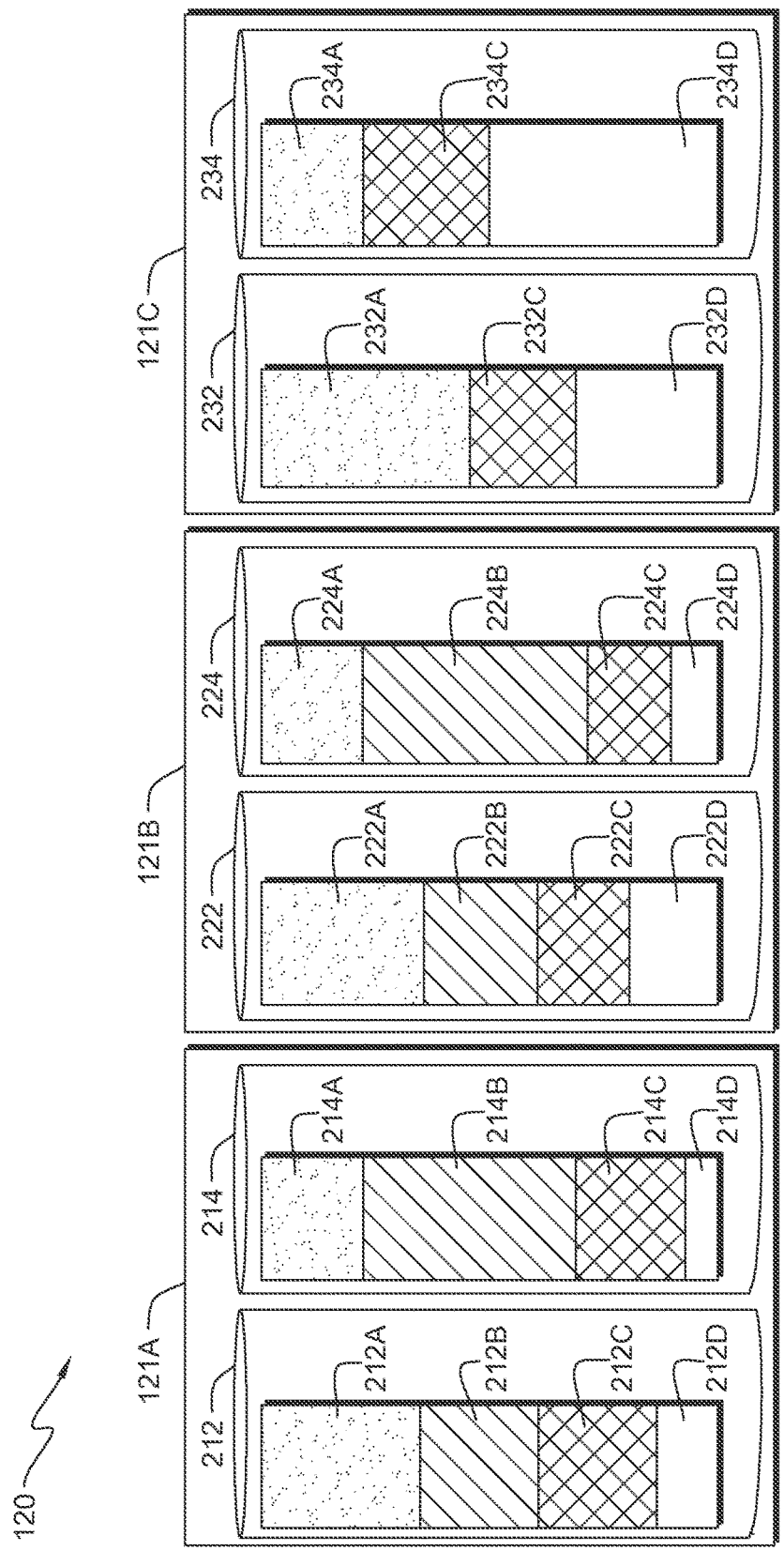
FIG. 2 is an example illustrating partial host ownership of the hosts from FIG. 1, in accordance with an embodiment of the present invention.

FIG. 2 is an example illustrating partial host ownership of the hosts from FIG. 1, in accordance with an embodiment of the present invention.

Hosts 121A, 121B, and 121C each contain memory and CPU resources. Memory 212, 222, and 232 are memory resources of hosts 121A, 121B, and 121C, respectively. CPU 214, 224, and 234 are CPU resources of hosts 121A, 121B, and 121C, respectively.

As depicted in FIG. 2, each resource (i.e., memory and CPU) is divided up into separate portions in order to depict which resources are owned by consumers and which are unowned, within a host. A first consumer (i.e., consumer A) owns memory 212A and CPU 214A on host 121A, memory 222A and CPU 224A on host 121B, and owns memory 232A and CPU 234A on host 121C. For example, consumer A may own 5 GB (out of 8 GB available) of memory and two CPUs (out of 8 CPUs available) on each of hosts 121A-C in resource group 120. A second consumer (i.e., consumer B) owns memory 212B and CPU 214B on host 121A and owns memory 222B and CPU 224B on host 121B. Consumer B does not own any resources on host 121C. For example, consumer B may own 1 GB of memory (out of 8 GB available) and four CPUs (out of 8 CPUs available) on each of hosts 121A and 121B, and does not own any resources on host 121C. A third consumer (i.e., consumer C) owns memory 212C and CPU 214C on host 121A, memory 222C and CPU 224C on host 121B, and owns memory 232C and CPU 234C on host 121C. For example, consumer C may own 1 GB of memory (out of 8 GB available) and one CPU (out of 8 CPUs available) on each of hosts 121A-C. Memory 212D, 222D, and 232D, and CPUs 214D, 224D, and 234D are each parts of hosts 121A-C, respectively, which are unowned by any consumers. The ownership of resources by each consumer is configured separately.

Figure 3:
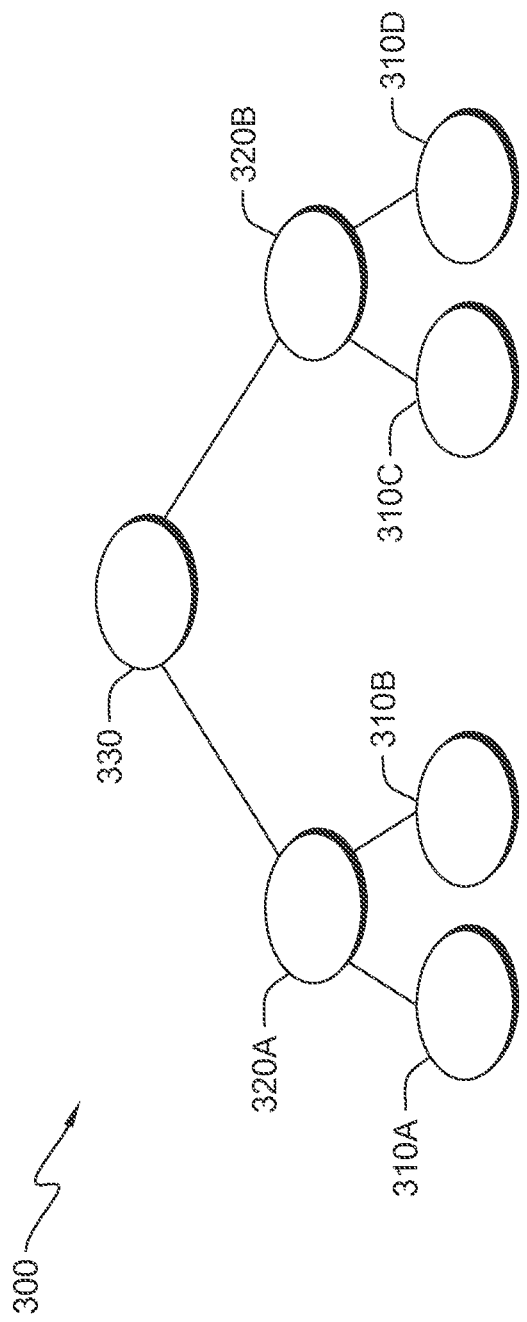
FIG. 3 depicts an example of a consumer tree, in accordance with an embodiment of the present invention.

FIG. 3 depicts an example of a consumer tree, in accordance with an embodiment of the present invention.

FIG. 3 depicts a consumer tree which organizes consumers into a structure, based on resource usage. In this exemplary embodiment, a consumer in the tree represents any entity that can demand resources from the cluster. A consumer may be, for example, a business service, a business process that is a complex collection of business services, an individual user, or an entire line of businesses. A multi-level consumer tree allows configuration of consumers in hierarchical form in order to match a business structure.

The root of the tree is the head of all consumers in a cluster and the root owns all resources of a resource group associated with a resource plan. In this exemplary embodiment, the root of the tree is depicted as consumer 330. Consumers connected directly to the root are called top level consumers. The top level consumers are the head of a consumer branch. For example, consumers 320A and 320 B are top level consumers. A non-top level consumer is any consumer which is not directly connected to the root, for example, consumers 310A, 310B, 310C, and 310D. Consumers that have no children (i.e., descendants) are leaf consumers. Applications can only be associated with leaf consumers. For example, consumers 310A, 310B, 310C, and 310D are leaf consumers, as each does not have any children. Two or more consumers sharing the same parent consumer are siblings. For example, consumers 310A and 310B are siblings with the same parent as each other, consumer 320A, and consumers 310C and 310D are siblings with the same parent as each other, consumer 320B. The child consumer's ownership must be a subset of the parent's ownership. Also, the sum of the children's ownership may not exceed the parent's ownership. Only leaf consumers directly use resources.

Figure 4:
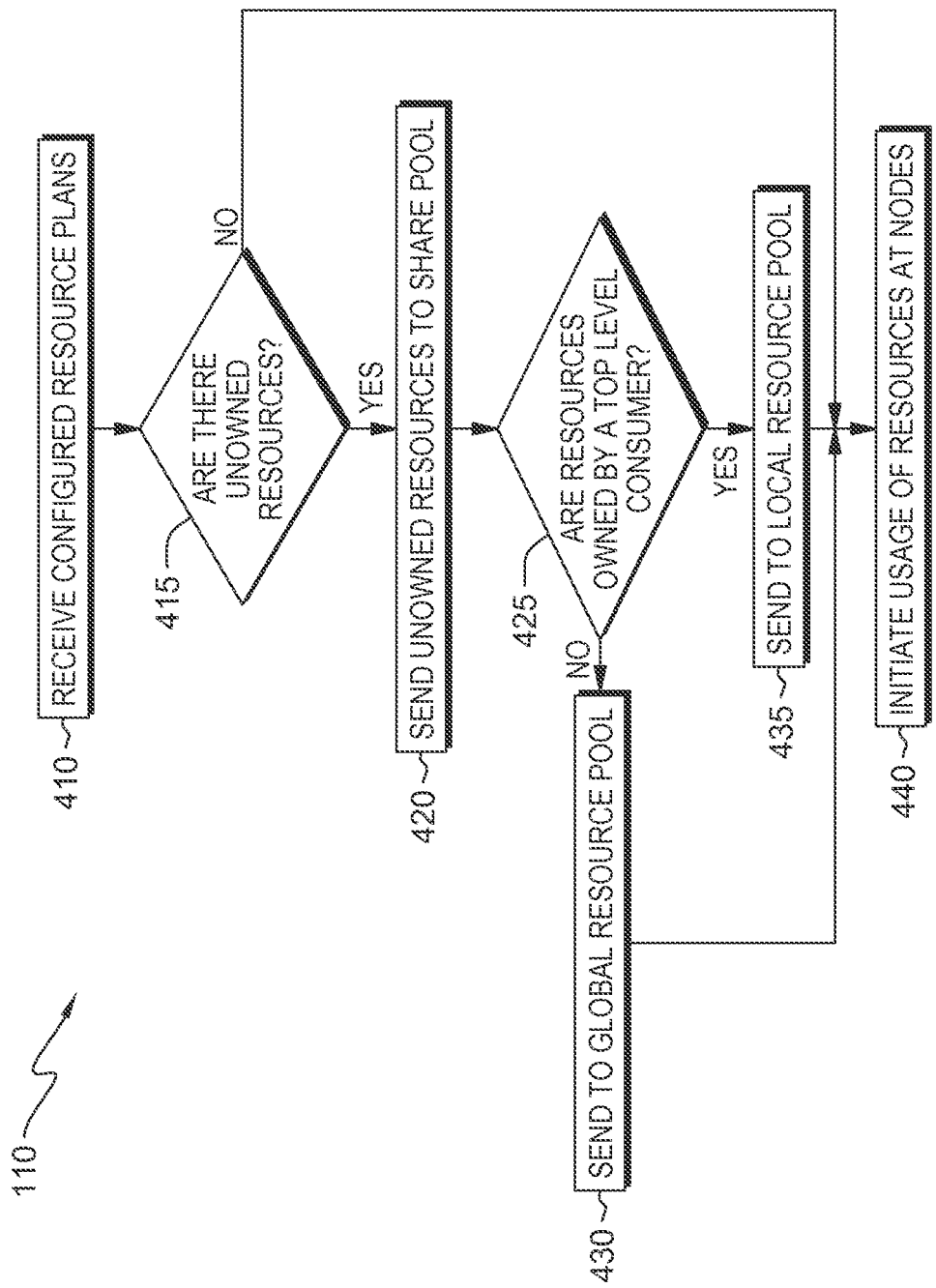
FIG. 4 is a flowchart depicting operational steps to construct a resource plan using a hierarchical distribution, based on consumer resource requirements, in accordance with an embodiment of the present invention.

FIG. 4 is a flowchart depicting operational steps to construct a resource plan using a hierarchical distribution, based on consumer resource requirements, in accordance with an embodiment of the present invention.

In step 410, resource scheduler 110 receives configured resource plans from an administrator. For each resource cluster, an administrator is responsible for preparing resource plans. A resource plan dictates how the resources in the resource groups associated with the resource plan should be distributed among multiple consumers. A program requests the desired resources based on anticipated workload demands and resource scheduler 110 works in conjunction with configured resource plans to facilitate the distribution of resources. Resource scheduler 110 allows users to select (i.e., configure) partial ownership of resources of each host in one or more resource groups. For example, in order to get the optimal performance out of a distributed cache, components of the distributed cache may run across a large number of hosts, and workloads which use the cache may run on the same machines as the cache components. In order to optimize this setup, the user may assign partial host ownership to consumers that run the distributed cache and may assign partial host ownership to the consumers that use that cache. In this exemplary embodiment, the resource plan is constructed as a consumer hierarchical tree with top-level consumers and non-top level consumers. Top level consumers get ownership directly from a resource group(s) associated with a resource plan, while non-top level consumers do not get ownership directly from a resource group(s) associated with a resource plan, but rather get ownership from their parents. The resource plan describes the relationship between the consumer tree and resource groups, and defines a plan for how cluster resources are to be shared among consumers. For example, two consumers may have partially selected resources within hosts from two separate resource groups, rendering some resources unowned (i.e., not owned). The first consumer may be a top level consumer, while the second consumer may be a non-top level consumer. Each consumer can be configured with ownership resources. A resource plan can be configured such that it is associated with one or more resource groups. In the instances where a consumer owns resources from multiple resource groups, the consumer can define preference for these resource groups. Based on anticipated workload demands, certain resources are more essential to procure for future usage and thus are assigned with a higher preference. Resources that are anticipated not to be as essential to procure for future usage are assigned with a lower preference. Resource scheduler 110 will eventually distribute the resources belonging to these resource groups to consumers based on dynamic demand and a configured policy. Resources assigned with higher preferences are used before those resources assigned with lower preferences. For example, one resource group contains powerful servers that are permanent fixtures in a cluster. A second resource group contains a users' desktop machines that only become part of the cluster when the user is not active and leave the cluster when the user starts using his desktop machine again. These desktop machines are much lower caliber than the dedicated servers and can leave the cluster at a moment's notice, so applications will prefer the dedicated server resource group over the desktop machine resource group. Resource scheduler 110 initiates the usage of the requested hosts in order to run the application.

In step 415, resource scheduler 110 determines if there are any unowned resources (i.e., resources not selected for ownership). In this exemplary embodiment, resource scheduler 110 determines which specific resources on a host within a resource group have been selected for ownership by a consumer. Resource plans allow for partial and/or full ownership as described above with respect to FIG. 2. Resource scheduler 110 determines which resources associated with particular hosts have been selected for ownership from those which have not been selected for ownership.

If, in step 415, resource scheduler 110 determines that there are not unowned resources (i.e., resources not selected for ownership), then, in step 440, resource scheduler 110 initiates usage of resources at nodes (i.e., hosts, computers, and machines). In this exemplary embodiment, resource scheduler 110 operates such that a consumer who owns resources has absolute control of these resources, but can lend these resources out, and these resources will be available for usage to the owning consumer on-demand. The lending process with respect to resource scheduler 110 is described in further detail in FIG. 6.

If, in step 415, resource scheduler 110 determines that there are unowned resources (i.e., resources not selected for ownership), then, in step 420, resource scheduler 110 sends the unowned resources to a shared resource pool. A shared resource pool can be a global resource pool or a local resource pool. Unowned resources first go to the local resource pools of the parent consumers and work up to the global resource pool of the root consumer. The policy by which resources are available for others to use are described in further detail with respect to FIG. 6.

In step 425, resource scheduler 110 determines if resources are owned by top-level consumers. In this exemplary embodiment, resource scheduler 110 operates within the guidelines of the multi-consumer policy for allocating unowned resources. As stated above, each consumer chooses full host ownership, partial host ownership (and amount of resource ownership), or no ownership. Resources associated with a resource plan may not all be owned by a consumer and are sent to a global resource pool that hierarchical consumers can access. In a resource plan with ownership configuration, resources that are unowned (i.e., not selected for ownership) by any top level consumer establish a global sharing pool. Resource scheduler 110 ascertains whether the consumer is a top level or non-top level consumer.

If, in step 425, resource scheduler 110 determines that resources are not owned by a top level consumer, then, in step 430, resource scheduler 110 sends the unowned resources to a global resource pool. Resources not owned by any non-top level consumer will be in a global resource pool that all consumers within that resource plan can share. Resources put in the global resource pool are shared by hierarchical consumers according to priority and share ratios (described further below). If a preference is not specified to a resource or resource group, by default it has a medium preference. For example, a consumer does not fully own all of the resources on hosts 121A-C in resource group 120 of FIG. 1, rendering some of the resources on hosts 121A-C in resource group 120 as unowned. Since the consumer is a top level consumer, the unowned resources on hosts 121A-C in resource group 120 are sent to the global resource pool which is described in further detail with respect to FIG. 6.

If, in step 425, resource scheduler 110 determines that resources are owned by top level consumers, then, in step 435, resource scheduler 110 sends the unowned resources to a local resource pool of the parent consumer. In this exemplary embodiment, resource scheduler 110 commands that resources not owned by a top level consumer are sent to a local resource pool. Consumers get resources from a local sharing pool (in the order from the closest sharing pool owner to the most distant one based on "ancestral" proximity) before gaining access to resources from the global sharing pool. Consumers access owned resources for usage prior to accessing resources in any sharing pool for usage. For example, a consumer does not fully own all of the resources on hosts 121A-C in resource group 120 rendering some of the resources on hosts 121A-C in resource group 120 as unused. Since the consumer is a non-top level consumer, the unused resources on hosts 121A-C in resource group 120 are sent to a local resource pool. Non-top level consumers can still access resources from the global resource pool.

Figure 5:
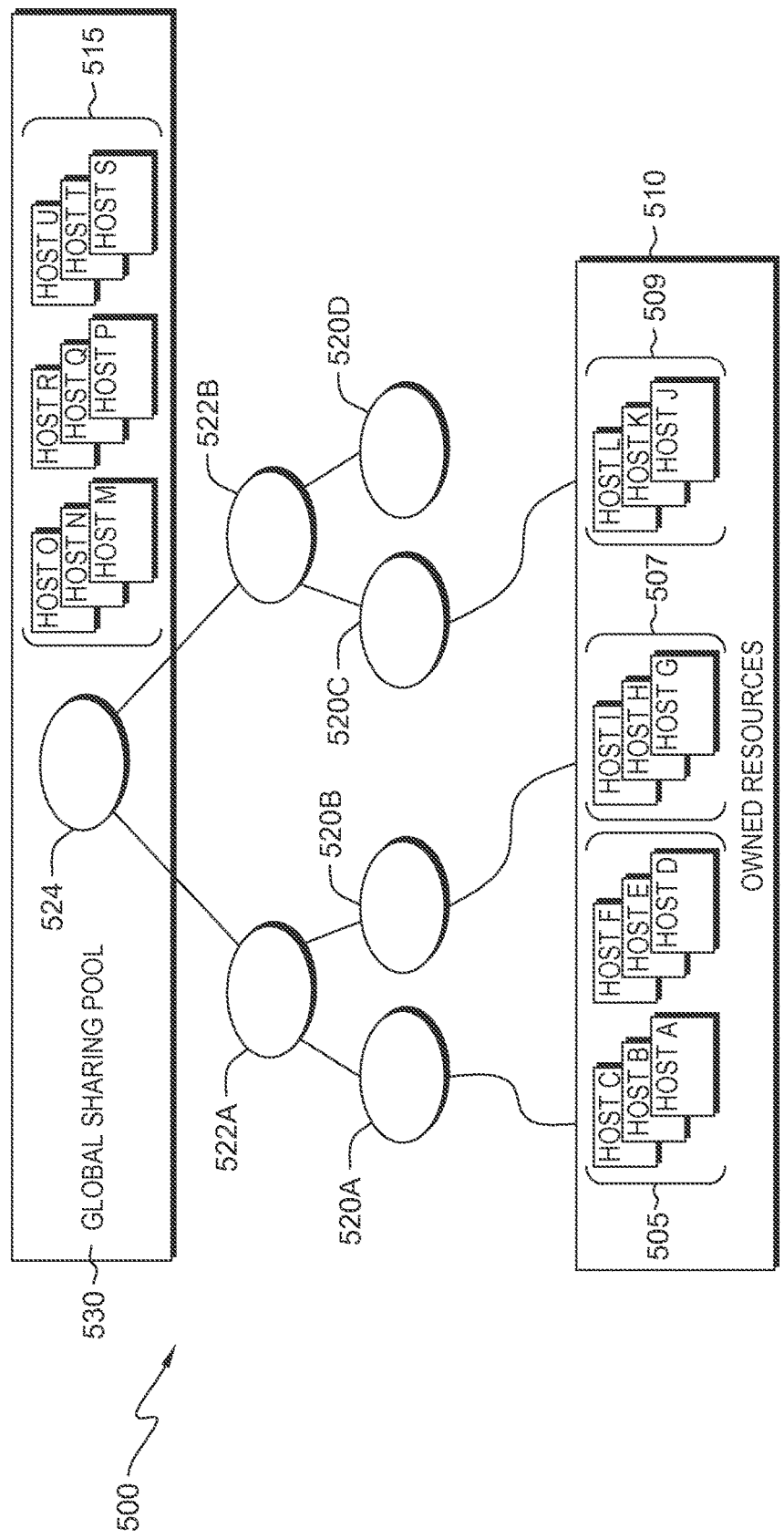
FIG. 5 depicts an example of a consumer tree in conjunction with sharing pools, in accordance with an embodiment of the present invention.

FIG. 5 depicts an example of a consumer tree in conjunction with sharing pools, in accordance with an embodiment of the present invention.

Groupings 505, 507, and 509 are located within owned resources 510. Owned resources 510 is a group containing resource hosts associated with a resource plan that are owned by consumers. Resources are located on hosts A-U. Hosts A-F are contained within grouping 505. Hosts G-I are contained within grouping 507. Hosts J-L are contained within grouping 509. Hosts M-U are contained within cluster 515. Leaf consumer 520A, leaf consumer 520B, leaf consumer 520C, and leaf consumer 520D are the direct points where consumers may use resources. Leaf consumer 520A has direct access to resources in grouping 505; leaf consumer 520B has direct access to resources in grouping 507; leaf consumer 520C has direct access to resources in grouping 509; and leaf consumer 520D does not have direct access to owned resources. Parent consumer 522A and parent consumer 522B are ancestral consumers (i.e., parent to at least one consumer in the hierarchy) that can engage in local resource pool activity. Global sharing pool 530 is a group containing grouping 515 and root consumer 524. Grouping 515 contains resources hosts associated with a resource plan that are unowned by any consumer and root consumer 524 is the point where the resources on hosts M-U can be used by other consumers. For example, leaf consumer 520C owns the full resources of hosts J-L. Each consumer can specify full host ownership or partial host ownership. For example, two consumers may have partially selected resources within hosts from two separate resource groups, rendering some resources unowned (i.e., not owned). One of the consumers is a top level consumer, while the other consumer is a non-top level consumer.

In this exemplary embodiment, the owned resource groups of leaf consumers must also be owned by its parent consumers. Leaf consumers owns subsets of resources which the parent consumers own. Parent consumers can own more than leaf consumers, but cannot own completely disparate resource groups. A leaf consumer and a non-leaf consumer may engage in partial ownership of resources but the root consumers engage in whole ownership of resources. For example, the root consumer 524 owns all of the resources in hosts A-L.

Resource scheduler 110 initiates resource usage for the consumers (e.g., leaf consumer 520A, leaf consumer 520B, leaf consumer 520C, leaf consumer 520D, parent consumer 522A, parent consumer 522B, and root consumer 524 in FIG. 5). In this example, owned resources can be lent out to local sharing pools. This approach integrates the concepts of resource ownership and resource lending with a sharing policy. Owned resources can be lent to and used at the parent consumer. Each consumer can be configured with a sharing priority and share ratios. Consumers that are siblings under that parent gain access to resources based on their relative priority and the share ratio. The sharing priority is only comparable among sibling consumers under the same parent. A range from 1-10 can be assigned for sharing priority with, for example, 1 have the highest priority and 10 have the lowest priority. Consumers with high share priority get all the available resources from the share pool before low share priority consumers can get any resources. Consumers with the same priority share resources proportionally according to their share ratio. Resource groups of the same preference are shared by consumers as a whole, while resource groups of different preference maintain the share ratio for the consumers separately.

For example, there is a resource group with 18 slots (i.e., portions available for sharing) and there are three consumers A, B, and C. Based on a configured sharing ratio policy, the slots are to be shared in a 1:2:3 ratio among A, B, and C, respectively. Thus, the sharing quota is 3 slots for A, 6 slots for B, and 9 slots for C. For example, leaf consumer 520A and leaf consumer 520B use resources from grouping 505 and grouping 507. Leaf consumer 520B that owns all the resources of hosts J, K, and L decides to lend host K to leaf consumer 520A. Leaf consumer 520A decides it wants to use the resources on host K so a consumer associated with leaf consumer 520B allows the consumer associated with leaf consumer 520A to use host K at parent consumer 522A. Since leaf consumer 520A and leaf consumer 520B do not connect to parent consumer 522B, the lent resources cannot be borrowed at parent consumer 522B. However, it is possible for parent consumer 522B to borrow host K if host K is lent to the global sharing pool. As mentioned above, a consumer that owns resources from multiple resource groups can define resource preference level for each resource group where each consumer can specify full host ownership or partial host ownership. The consumer will use more preferred resource groups before using less preferred resource groups. Resources that are not owned by any of a parent's descendants establish a local resource pool that all its descendants have access to the local resource pool. Global resource pool differs from a local resource pool as root consumer 524 is the point where the resources on hosts M-U are used and all consumers have access to the global resource pool. Also, each consumer gets access to resources from local resource pools (in order from the closest connected consumer to the most distantly connected consumer) before getting access to resources from the global sharing pool.

Figure 6:
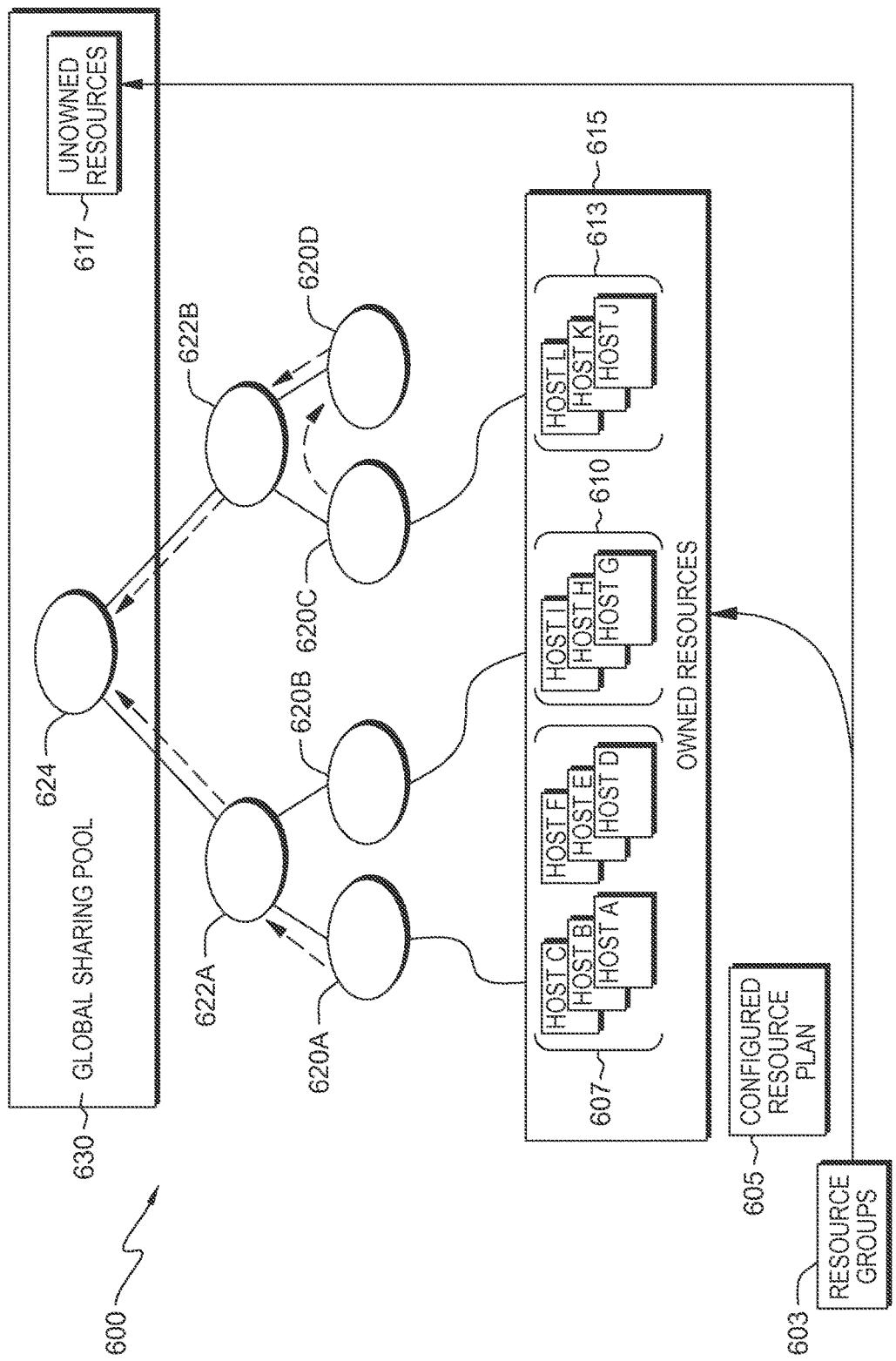
FIG. 6 is an example consumer tree illustrating resultant changes in resource allocation and resource usage upon workload demand changes, in accordance with an embodiment of the present invention.

FIG. 6 is an example consumer tree illustrating resultant changes in resource allocation and resource usage upon workload demand changes, in accordance with an embodiment of the present invention.

Resource groups 603 contain hosts that consumers can select to own. After the consumer selects resource ownership (partial or full) of hosts, configured resource plan 605 is evaluated by resource scheduler 110. Upon evaluation, resource scheduler 110 delineates between owned resources and unowned resources where the owned resources are in the grouping of owned resources 615 and the unowned resources are in unowned resources grouping 617. Resources are located on hosts where hosts A-F are contained within grouping 610; hosts G-I are contained within grouping 610; and hosts J-L are contained within grouping 613. Leaf consumer 620A has direct access to resources in grouping 607; leaf consumer 620B has direct access to resources in grouping 610; leaf consumer 620C has direct access to resources in grouping 613; and leaf consumer 620D does not have direct access to owned resources. In instances where a resource plan without any ownership configuration, all resources associated with the resource plan establish a global sharing pool. In instances of a resource plan with ownership configuration, resources that are not owned by any top-level consumer establish a global sharing pool. The grouping of unowned resources 617 is sent to the global sharing pool 630 (after going to parent consumers) where the grouping of unowned resources 617 may be used by root consumer 624. Parent consumer 622A and parent consumer 622B (each have children consumers) facilitate local resource pool activity.

Share pools are at every non-leaf consumer and are accessible only to children consumers of the parent consumer. If the resources in the share pool are not completely used, those unused resources get lent to its parent consumer (i.e., next higher branch). In this exemplary embodiment, the unused resources are lent up to a share pool associated with a parent consumer until hitting the root consumer (i.e., the global resource pool) of the consumer tree. For example, root consumer 624 is the root consumer, and global resource pool 630 is where unused resources are sent when the unused resources are not accessed by any of the parent consumers. Preferred resources get used prior to less preferred resources.

Resource scheduler 110 may lend out a consumer's owned resources if the consumer doesn't have enough workload. In this exemplary embodiment, a consumer can configure a resource plan to partially or fully own each host. The consumer may start using less than the full amount of owned resource on each host and increase when its workload grows. Ownership resource group preference is observed by borrowers. When a consumer lends out its owned resources to a share pool, it first lends out its least preferred resources and the resources that are less preferred by the lending owner are used by the other borrowing consumer first. For example, consumer B lends resources to consumer A via the share pool. Consumer B specified a resource group preference with the attributes of host G being the most preferred and the attributes of host I being the least preferred. Thus, consumer B would first lend resources on host I to consumer A (due to the attributes of host I being the least close to consumer B's resource group preference). If consumer B lends resources on host I and host G to consumer A, then consumer A uses the resources on host I (i.e., the least preferred) prior to the resources on host G (i.e., the most preferred).

Resource scheduler 110 adheres to specific guidelines when consumers lend out resources. In this exemplary embodiment, a consumer may specify preferences for usage of owned resources and potential usage of unowned resources. The consumer who owns the resource can lend out the resource to its parent's share pool (for eventual consumption by other leaf consumers) but will be guaranteed to get the resource back when the consumer itself (if it is a leaf consumer) or the consumer's descendants (if it is a non-leaf consumer) have demand. Consumers may reclaim its owned resources that are being borrowed by other consumers with most-preferred ones being reclaimed first. The consumer-level preferences of a consumer override the global and its parent consumer's preferences. Should a consumer not indicate a preference for resource, the preference is inherited from its parent's preference. Among the resources of the same preference, it will first reclaim the ones that are borrowed by its furthest siblings and relatives. For example, leaf consumer 620A doesn't have enough workload demand to use all of its owned resource so leaf consumer 620A lends out two hosts within grouping 607 which it partially owns to its parent consumer 622A as part of its parent's local resource pool. All descendants of parent consumer 622A (leaf consumer 620A and leaf consumer 620B) have the option of using the two hosts sent to parent consumer 622A. All of the descendants of the parent consumer 622 A (leaf consumer 620A and leaf consumer 620B) do not have the need extra resources and thus these two hosts are sent to the root consumer 624 and merged into the global sharing pool. In another example, leaf consumer 620C does not have a workload demand so leaf consumer 620C lends out two hosts which it fully owns to its parent consumer 622B as part of its parent's local sharing pool. The consumer associated with leaf consumer 620D (which is a descendant of parent consumer 622B) has extra demand for one of the hosts and uses it. The left over host in turn is sent to the root consumer 624 and thus merged to the global sharing pool.

Figure 7:
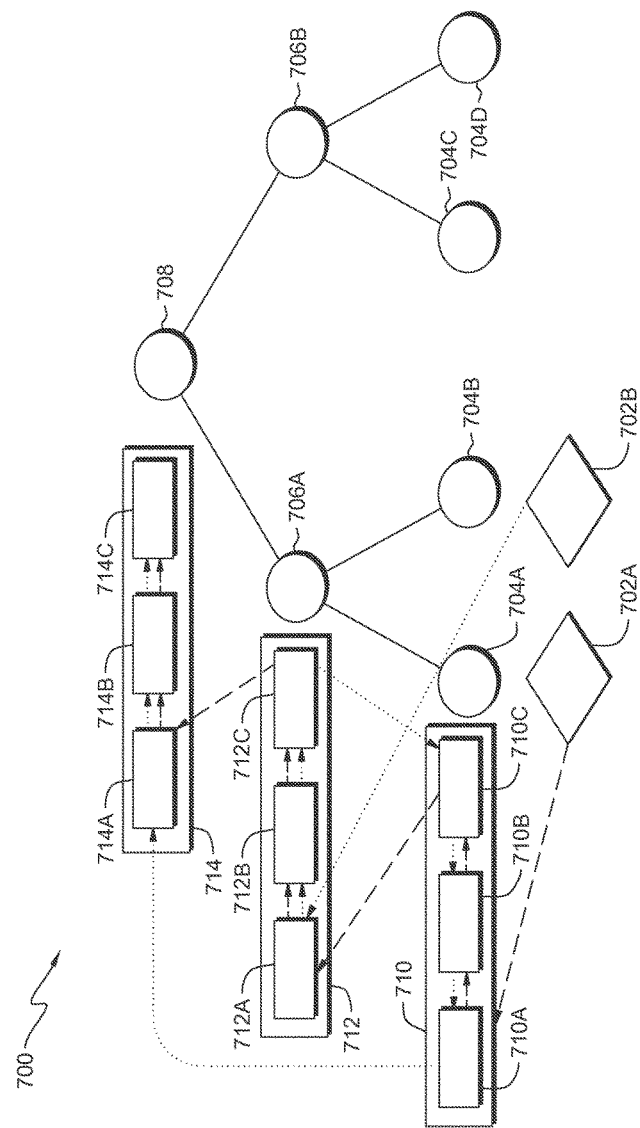
FIG. 7 is an example consumer tree illustrating consumer hierarchy in conjunction with resource usage, in accordance with an embodiment of the present invention.

FIG. 7 is an example consumer tree illustrating consumer hierarchy in conjunction with resource usage, in accordance with an embodiment of the present invention.

Resource scheduler 110 manages consumer hierarchy in conjunction with resource usage. In this exemplary embodiment, the resource plan is constructed as a consumer hierarchical tree. A resource plan can be associated with one or multiple resource groups. The resource scheduler will distribute the resources belonging to these resource groups to consumers with demand according to configured policy. Each resource plan defines how consumers should share resources in a cluster as the consumers compete for resources in order to meet work demands.

In this exemplary embodiment, consumer 708 is a root consumer; consumer 706A and consumer 706B are parent consumers; and consumer 704A, consumer 704B, consumer 704C, and consumer 704D are leaf consumers. In this exemplary embodiment, consumer 704A owns resources from three different resource groups—710A, 710B, and 710C—which are grouped together as box 710. Consumer 706A owns resources from three different resource groups—712A, 712B, and 712C—which are grouped together as box 712. Consumer 708 owns resources from three different resource groups—714A, 714B, and 714C—which are grouped together as box 714.

Resource scheduler 110 allocates resources to run multiple applications for multiple consumers. In this exemplary embodiment, resource scheduler 110 runs two different computing applications for two different consumers. Computing applications use owned resources first by closest ownership (i.e. linkage) and then by preference level. At each resource group, a consumer is able to define whether to reclaim resources from the more-preferred resource group before using idle resources available from a less-preferred resource group. Resources will be lent out by reverse order of preference of the owner. For example, consumer 704A (leaf consumer) and consumer 704B (leaf consumer) intend to run Application 702A and Application 702B, respectively. Application 702A is linked to resource group 710A and thus Application 702A starts using resources at resource group 710A. Consumer 704A owns resource and thus Application 702A uses resources starting at resource group 710A to resource group 710B to resource group 710C for consumer 704A. Then, application 702A uses resources starting at resource group 712A to resource group 712B to resource group 712C for consumer 706A. Finally, application 702A uses resources starting at resource group 712A to resource group 712B to resource group 712C for consumer 706A.

In this exemplary embodiment, leaf consumer 704B does not own any resources, so leaf consumer 704B must borrow resources from other consumers. Application 702B does not own any resource groups, and starts using resources at its parent consumer's local resource pool of box 712. In this exemplary embodiment, application 702B uses resources starting at resource group 712A to resource group 712B to resource group 712C for consumer 706A. Then, application 702B uses resource group 710C to resource group 710B to resource group 710A for consumer 704B. Finally, application 702B uses resource group 714A to resource group 714B to resource group 714C. In this exemplary embodiment, the borrowing of resources from consumer 704A takes place in the reverse order of the resource group preference of lending consumer 704A and subsequently at a higher level consumer (e.g., the root consumer). Consumer 704A uses resource groups in the order of: 710A, 710B, and 710C. Thus, consumer 704B uses the resource groups in the order of: 710C, 710B, and then 710A. The subsequent borrowing takes place at consumer 708 (a root consumer).

Figure 8:
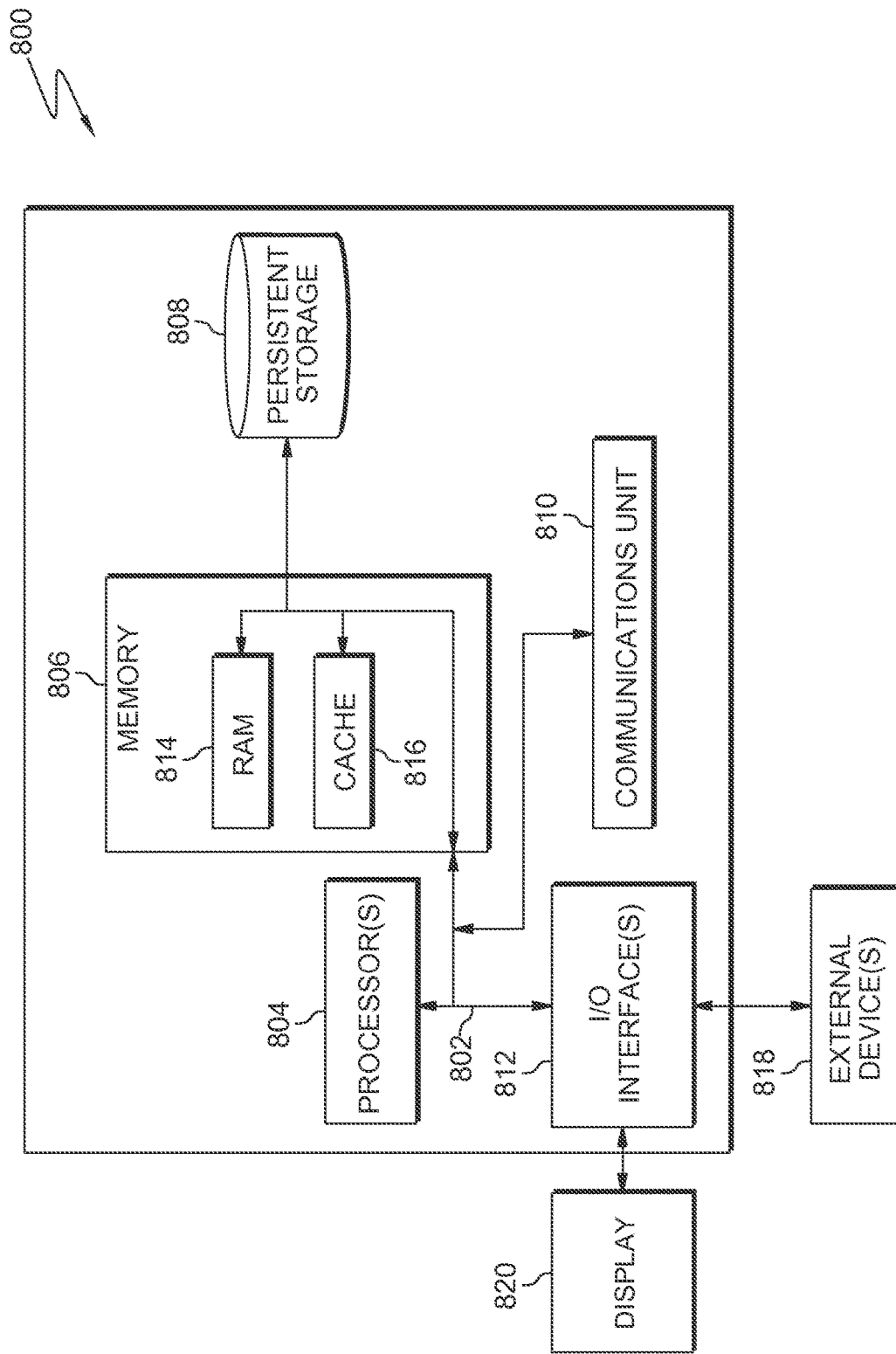
FIG. 8 depicts a block diagram of internal and external components of a data processing system, in accordance with an embodiment of the present invention.

FIG. 8 depicts a block diagram of internal and external components of computer system 800, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computer system 800 includes communications fabric 802, which provides for communications between one or more processors 804, memory 806, persistent storage 808, communications unit 810, and one or more input/output (I/O) interfaces 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media. Software (e.g., modeling program, travel optimization program, etc.) is stored in persistent storage 808 for execution and/or access by one or more of the respective processors 804 via one or more memories of memory 806.

Persistent storage 808 may include, for example, a plurality of magnetic hard disk drives. Alternatively, or in addition to magnetic hard disk drives, persistent storage 808 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 808 can also be removable. For example, a removable hard drive can be used for persistent storage 808. Other examples include optical and magnetic disks, thumb drives, and smart cards that are inserted into a drive for transfer onto another computer-readable storage medium that is also part of persistent storage 808.

Communications unit 810 provides for communications with other computer systems or devices via a network. In this exemplary embodiment, communications unit 810 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to a computing device through communications unit 810 (e.g., via the Internet, a local area network or other wide area network). From communications unit 810, the software and data can be loaded onto persistent storage 808.

One or more I/O interfaces 812 allow for input and output of data with other devices that may be connected to computer system 800. For example, I/O interface 812 can provide a connection to one or more external devices 818 such as a keyboard, computer mouse, touch screen, virtual keyboard, touch pad, pointing device, or other human interface devices. External devices 818 can also include portable computer-readable storage media such as, for example, thumb drives, portable optical or magnetic disks, and memory cards. I/O interface 812 also connects to display 820.

Display 820 provides a mechanism to display data to a user and can be, for example, a computer monitor. Display 820 can also be an incorporated display and may function as a touch screen, such as a built-in display of a tablet computer.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for allocating multiple resources, the method comprising:
   receiving, by one or more processors, a configured resource plan, wherein the configured resource plan manages clusters that contain at least a plurality of resources, wherein the plurality of resources contains a set of owned resources and a set of unowned resources;
   constructing, by one or more processors, a hierarchical tree from the configured resource plan, wherein the hierarchical tree has a set of top-level consumers and a set of non-top-level consumers, and wherein the set of top-level consumers and the set of non-top-level consumers contain one or more consumers within the hierarchical tree;
   allocating, by one or more processors, the set of unowned resources according to a usage policy that prioritizes resource allocation to the set of top-level consumers first;
   associating, by one or more processors, the hierarchical tree with a usage policy, and wherein the usage policy is configured such that:
   the plurality of resources assigned with a higher preference are used prior to the plurality of resources assigned with a lower preference,
   the one or more consumers are assigned with a higher priority or a lower priority, and
   the one or more consumer assigned with the higher priority use a set of available resources, among the plurality of resources, prior to the one or more consumers assigned with the lower priority;
   sending, by one or more processors, the set of unowned resources to a share pool, wherein the share pool is configured to be accessible to the one or more consumers, and wherein the share pool comprises a global pool and a local pool;
   determining, by one or more processors, a change in a workload demand from the one or more consumers;
   associating, by one or more processors, the plurality of resources with the one or more consumers, wherein the associated plurality of resources run multiple applications for the one or more consumers;
   running, by one or more processors, a first application and a second application among multiple applications, wherein:
   the first application is associated with a first consumer among the one or more consumers that owns at least in part of the plurality of resources,
   the second application is associated with a second consumer among the one or more consumers that does not own any resources, and
   the first consumer and the second consumer are leaf consumers;
   enabling, by one or more processors, the second consumer to use at least in part of the plurality of resources from a third consumer, wherein the third consumer is a higher level consumer than the second consumer and the first consumer, and the third consumer is not a root consumer;
   lending, by one or more resources, at least in part of the plurality of resources to the second consumer from the first consumer in a sequential order for future use by the second consumer, wherein the sequential order of the lending is dictated by a reverse order of preference of the first consumer for the plurality of resources; and
   enabling, by one or more processors, the first consumer to reclaim the at least in part of the plurality of resources lent to the second consumer.

2. The method of claim 1, further comprising:
   receiving, by one or more processors, a set of available resources for partial ownership or full ownership; and
   sending, by one or more processors, the set of available resources owned by the set of top-level consumers to the share pool.

3. The method of claim 2, further comprising:
   sending the set of available resources, owned by the one or more consumers, to a local pool; and
   accessing, by one or more descendants of the plurality of consumers, the set of available resources associated with the local pool.

4. The method of claim 1, wherein constructing the hierarchical tree, comprises:
   determining, by one or more processors, the plurality of resources from the configured resource plans is selected for ownership.

5. The method of claim 1, wherein determining the change in the workload demand from the one or more consumers, comprises:

determining, by one or more processors, whether the workload demand increases or decreases;

identifying, by one or more processors, a set of available resources, among the plurality of resources;

responsive to determining that the workload demand of an owner decreases, sending, by one or more processors, the set of available resources to the share pool;

invoking, by one or more processors, the hierarchical tree wherein usage of the set of available resources starts at a lower level consumer of the hierarchical tree and ends at a higher level consumer of the hierarchical tree; and responsive to determining that the workload demand increases, lending, by one or more processors, the set of available resources from the share pool to the one or more consumers, wherein a lent out set of available resources are used in reverse order of a preference of an owner of the set of available resources.

6. The method of claim 1, further comprising:

in response to determining the change in the workload demand from the one or more consumers, reclaiming, by an owning consumer, resources among the plurality of resources selected for ownership, from the local pool and the global pool.

7. The method of claim 1, wherein allocating, by one or more processors, the set of unowned resources according to the usage policy that prioritizes resource allocation to top-level consumers first comprises:

allocating, by one or more processors, the set of unowned resources with a higher preference than the set of unowned resources with a lower preference;

allocating, by one or more processors, the set of unowned resources with a higher preference to the one or more consumers assigned with the higher priority;

allocating, by one or more processors, the set of owned resources prior to a set of shared resources; and allocating to consumers having a same priority, by one or more processors, unowned resources proportionally based on a ratio.

\* \* \* \* \*